(12) United States Patent
Muller

(10) Patent No.: US 8,162,132 B2
(45) Date of Patent: Apr. 24, 2012

(54) DEFLECTION APPARATUS FOR A CONVEYING SYSTEM

(75) Inventor: Erwin Muller, Durnten (CH)

(73) Assignee: WRH Walter Reist Holding AG, Ermatingen (CH)

(*) Notice: Subject to any disclaimer, the term of this patent is extended or adjusted under 35 U.S.C. 154(b) by 1 day.

(21) Appl. No.: 12/678,437

(22) PCT Filed: Apr. 23, 2008

(86) PCT No.: PCT/CH2008/000184
§ 371 (c)(1),
(2), (4) Date: Jun. 22, 2010

(87) PCT Pub. No.: WO2009/036580
PCT Pub. Date: Mar. 26, 2009

(65) Prior Publication Data
US 2010/0294626 A1    Nov. 25, 2010

(30) Foreign Application Priority Data
Sep. 17, 2007 (CH) ..................... 1448/07

(51) Int. Cl.
*B65G 17/24* (2006.01)
(52) U.S. Cl. ................... 198/779; 198/831
(58) Field of Classification Search ............ 198/779, 198/831, 850, 853
See application file for complete search history.

(56) References Cited

U.S. PATENT DOCUMENTS

| | | | |
|---|---|---|---|
| 5,306,212 A | 4/1994 | Eberle | |
| 6,298,982 B1 * | 10/2001 | Layne et al. | 198/831 |
| 6,386,355 B1 * | 5/2002 | Willems | 198/831 |
| 7,748,523 B2 * | 7/2010 | Robertson | 198/831 |
| 7,785,011 B2 * | 8/2010 | Reist | 198/779 |
| 2003/0194161 A1 | 10/2003 | Murata | |
| 2010/0038212 A1 | 2/2010 | Seger et al. | |
| 2010/0263993 A1 | 10/2010 | DeAngelis et al. | |

FOREIGN PATENT DOCUMENTS

| | | |
|---|---|---|
| CA | 2600729 | 9/2006 |
| DE | 2417910 | 10/1975 |
| DE | 37 26 059 | 12/1988 |
| DE | 10135659 | 2/2003 |
| EP | 1 340 698 | 9/2003 |
| EP | 2154089 | 2/2010 |
| FR | 2 196 281 | 3/1974 |
| GB | 2415419 | 12/2005 |
| RU | 2255888 | 7/2005 |
| WO | 2005/087627 | 9/2005 |
| WO | 2009/036580 | 3/2009 |

* cited by examiner

*Primary Examiner* — James R Bidwell
(74) *Attorney, Agent, or Firm* — Rankin, Hill & Clark LLP

(57) ABSTRACT

A deflection apparatus for a conveying system has a central body with a roller body which circulates around the central body, wherein the roller body has a multiplicity of rollers which are guided with play and roll in a roller track of the central body wherein the deflection apparatus forms an independent structural unit which can be assembled, dismantled and transported as a unit, and thus can be installed as an independent structural unit in order to deflect a conveying means in a conveying system. The deflection apparatus is preferably configured in a lightweight design, having rollers made from plastic and the central body made from plastic or aluminum.

22 Claims, 7 Drawing Sheets

DEFLECTION APPARATUS FOR A CONVEYING SYSTEM

BACKGROUND OF THE INVENTION

1. Field of the Invention

The invention relates to the field of materials conveying technology. It relates, in particular, to a deflection apparatus for a conveying system.

2. Description of Related Art

Conveying devices typically comprise conveying elements, belts, chains, cables, bands, wheels, etc., which are generally conveyed along three-dimensionally running tracks. The conveying elements are here pushed and/or pulled by a drive mechanism. In the rounding of curves, friction forces are generated, which act counter to the drive mechanism. In order to reduce these friction forces, it is known, for instance from WO 99/35063, to arrange fixedly mounted rollers in a deflection region. The mounting of the rollers, however, creates friction and noise.

Another deflection apparatus is known, for instance, from DE 101 35 659 A1. In this, in a conveying apparatus, an endless supporting chain is provided, which supports a side-arc chain of the conveying apparatus in a curve. For this purpose, protruding carrying elements are fitted to the supporting chain, which press against the side-arc chain and in this way support the same. The structure of the apparatus as a whole is complex.

In WO 2007/045 105, cylindrical deflection rollers for a cable conveying system having two parallel cables are disclosed. At each deflection of the cable pair—regardless of whether the deflection angle is, for example, 10° or 180°—a deflection cylinder having a correspondingly large diameter, and thus also having a corresponding inertia of mass, is necessary.

FR 2.196.281 shows a deflection apparatus in a conveying system, in which a roller chain circulates around a quadrant-shaped track, pinions and a tensioning apparatus. In another embodiment, rollers circulate in grooves. The rollers are distanced from one another by intermediate elements having low friction coefficient. The deflection apparatus is a fixed component part of a curve element of a conveyor track, which bears a conveying chain (1, 2). The deflection apparatus forms no independent structural unit: when the conveyor track is dismantled, the deflection apparatus, too, separates along the 45° line into two halves (and vice versa).

DE 37 26 059 shows a similar conveyor curve for high loads (chain scraper conveyor) having a circulating roller chain. This circulates around a curved region, supporting rollers and a tensioning rail (FIG. 1). A constriction of the rollers runs along a corresponding protrusion of the guide. Here too, the conveyor curve is an integral component part of the conveyor track.

BRIEF SUMMARY OF THE INVENTION

The object of the invention is therefore to provide a deflection apparatus for a conveying system of the type stated in the introduction, which deflection apparatus eliminates the above-stated drawbacks. In particular, one object is to provide a low-friction deflection apparatus which also has a simple structure and is favorable in terms of manufacture and assembly.

This object is achieved by a deflection apparatus for a conveying system.

In the inventive deflection apparatus for a conveying system, the deflection apparatus comprises a central body with a roller body circulating around the central body, wherein the roller body comprises a multiplicity of preferably loose rollers guided with play, which roll in a roller track of the central body, wherein the deflection apparatus forms an independent structural unit, which can be assembled, disassembled and transported as a unit and can, thus, be installed as an independent structural unit in order to deflect or support a conveying means in a conveying system in case of a change of direction. The conveying means is, for instance, a conveyor belt formed from one piece or from individual consecutive support elements, or a conveying chain or a cable conveyor, etc. The conveying means, thus, rolls over the rollers on the central body. The pressure between the conveying means and the central body is transmitted by the rolling rollers without a bearing support of the shafts of the rollers being placed under substantial load. This bearing support serves merely to distance the rollers from one another and to prevent them, in the unloaded state, from falling out.

Since the deflection apparatus is an independent structural unit, which has only to be mounted such that it acts against the conveying means, without the need for additional elements to be interlocked with the conveying means or be individually mounted, it becomes possible to set up and modify modular conveying systems in a quick and easy manner, as in a modular construction system. The deflection apparatus can be produced and supplied as a compact, autonomous structural unit. The deflection apparatus is, thus, not integrated into the shape of the conveying system. In particular, the deflection apparatus is not formed onto carrying elements of the conveying system, but can be disassembled from such carrying elements without the carrying elements losing their carrying function.

Preferably, the deflection apparatus is realized in lightweight construction, with rollers made from plastic, for instance, and the central body from plastic or aluminum. The rollers can be produced for higher loads, essentially also as solid cylinders, or from sleeves made from aluminum or from steel (plate). A smooth-running system with low inertia of mass and with low energy losses is thereby created. Since no significant friction forces are generated—compressive forces are transmitted by the rollers without friction on a shaft—the deflection apparatus can be operated without lubricant and is hence less prone to dirt contamination.

The deflection apparatus can be arranged as a unit for a horizontal or vertical deflection, or for a deflection lying obliquely in space. In a preferred embodiment of the invention, the rollers run (in accordance with a path of the conveying means) along a twisted track. Such twisting of the track can be present in a straight or curved region of the roller track. It is here also possible to clamp the conveying means, for example a chain of rigid conveying elements, between two deflection apparatuses according to the invention and to guide said conveying means along a twisted path which is curved in three dimensions in space.

The shape of the deflection apparatus is substantially defined by the shape of the central body and corresponds to the desired deflection angle. The deflection angle measures, for instance, between 20 degrees and 200 degrees. Along this deflection angle, or, in other words, in a rolling region, the conveying means is supported by the roller body of the deflection apparatus, or the conveying means rolls on the roller body. Preferably, the return circuit of the roller body runs outside the rolling region on the shortest route, or else in a curved track running roughly parallel to the rolling region. The deflection apparatus, in comparison to a cylindrical deflection apparatus, hence occupies substantially less space.

In a preferred embodiment of the invention, the rollers are guided in a roller belt and are distanced from one another.

Preferably, the roller belt can here be tensioned against the central body by means of a tensioning body, the tensioning body being fixed and the roller belt rolling with the rollers on the tensioning body. The tensioning body, thus, comprises no moving parts and can be shaped in one piece. A constructively very simple, and yet low-friction tensioning apparatus is thus obtained.

In a further preferred embodiment of the invention, the tensioning body is mounted on the central body with a mounting, and the central body forms with the roller belt and the tensioning body an independent structural unit, which can be assembled, disassembled and transported as a unit.

Preferably, the roller belt is produced from a flexible flat material, in particular from a fabric tape or plastic-permeated fabric. Further preferred usable embodiments of roller belts are disclosed in WO 2006/094423, in particular in FIGS. 8 to 18 and the corresponding sections of the description, the content of which is herewith included in its entirety by reference. For instance, a roller belt between the mountings of the rollers can also comprise a preferably central constriction, so that the roller belt is bendable also about an axis perpendicular to the plane of the roller belt.

Preferably, the roller belt comprises recesses having bearing projections, and the rollers, with indentations, are inserted in the bearing projections and are thus loosely supported by the bearing projections. The rollers are shaped cylindrically, or preferably slightly cambered, i.e. barrel-shaped, the roller track being correspondingly concave in shape. Axial forces—in the case of vertical arrangement of the rollers, this essentially corresponds only to the weight of the rollers—are hence transmitted to the roller track without the rollers, on their end face, coming into contact with the roller track and rubbing.

In another preferred embodiment of the invention, the roller belt comprises balls as rollers. The balls are preferably clicked or snapped in place in flat bearing elements made from, for instance, plastic such as nylon, which are held in the roller belt. In particular, two or more such roller belts are arranged such that they circulate around the central body. These two or more roller belts run, at least in the rolling region, substantially in parallel or at a constant distance apart. Support elements of the conveying system here comprise rolling grooves, which pass over the balls and roll on these. For this purpose, the supports are preferably arranged on the cables such that they follow relatively closely one upon the other, in particular such that those portions of the cables which lie between the supports and form a polygon do not touch the deflection apparatus.

In another preferred embodiment of the invention, the roller belt runs with its two outer edges in a belt-guiding groove of the central body and is thereby guided and prevented from falling out. The belt-guiding groove thus prevents the roller body from falling out of the central body. The belt-guiding groove is shaped in a part of the central body and forms, in principle, a slot running around the central body, the roller body, however, in the region of the tensioning body, running partially freely, i.e. not in the belt-guiding groove, to allow adjustment of the tensioning body.

In other preferred embodiments of the invention, the roller body is formed from a multiplicity of individual rollers which are not chained together. The rollers are arranged such that they roll around the central body and are distanced from one another by distancing bodies. The distancing bodies are mounted rotatably on the shafts of the rollers, preferably at both ends of the rollers, next to a rolling part of the rollers, and prevent the rotating rollers from touching one another.

Preferably, the rollers, similarly to the aforementioned cambered embodiment, comprise shapings for the transmission of axial forces to the central body, and the roller track comprises correspondingly shaped shapings.

In a preferred embodiment of the invention, the rollers are held against the central body by at least one belt which circulates around the central body and rolls on the rollers. The conveyed supports of the conveying means, in turn, comprise recesses or grooves, into which the rolling belts fit. Similarly, the rollers comprise concave roller portions in which the at least one circulating belt runs, and the central body comprises corresponding guide projections. The rollers are, thus, held in the axial direction by the engagement of the guide projections in the concave roller portions. The guide projections are formed by a shaping on a roller track of the central body, or by further, stationary belts or cables, which are placed in a groove of the roller track.

In further preferred embodiments of the invention, the rollers run with their distancing bodies or their axial ends in a retaining groove of the roller track, the retaining groove preventing the rollers from falling out of the roller track of the central body.

Preferably, arranged between the rollers and the conveyor belt is a protective means, which rolls on the rollers and encloses the roller body on several sides, preferably on three sides. The rollers are thereby protected from dirt contamination. In a preferred embodiment of the invention, the protective means is formed by a succession of bar elements, which, following closely one upon the other and touching one another, roll on the rollers. In accordance with any shapings (grooves or beads) on the rollers, the bar elements, or the protective means in general, also comprise corresponding shapings for the transmission of axial forces.

In another embodiment of the invention, simply a belt is present, which on the outer side of the roller body encloses the roller body. In the region of the deflection on the conveying section, the belt thus lies between the roller body and the deflected conveying elements or bodies. Rattling of these same on the rollers of the roller body is thereby heavily reduced or eliminated.

In a further preferred embodiment of the invention, the central body is constructed in the modular construction system from standardized sector elements. An individual sector element encompasses an angle of, for instance, 15° or 30° or 45°, and the sector elements can be lined up and connected in order to encompass a greater angle. Preferably, the central body also comprises end elements, which cause the roller body to be led up to the roller track or led away from the roller track, and the roller body to be deflected from or to the return circuit. A central body is formed in this case by two end elements and one or more sector elements. With just three or more different elements, it is thus possible to assemble central bodies which encompass a (stepwise) predeterminable deflection angle. The individual sector elements can, in turn, consist of individual parts, for instance one or more middle bodies, which is/are sandwiched between two belt-guiding bodies, or a top and a bottom body, which each comprise a belt guide and, placed one on top of the other, form a sector of the central body. The individual parts of different sector elements (middle body and belt-guiding body, or top body and bottom body) can overlap the individual parts of adjacent sector elements or end elements in order to enable a stable connection. Certain individual parts can also extend around the whole of the deflection angle, for instance a rolling plate acting as a roller track. Such a rolling plate made from flexible material, for instance plastic, can exist as a product manufactured by the yard and, if need be, can be cut to length in accordance with the desired deflection angle.

For the assembly of a deflection apparatus, the necessary number of sector elements, together with two end elements, are selected in accordance with the predetermined deflection angle. A belt with inserted rollers, manufactured and supplied as an endless belt, is cut to the required length. The ends of the belt are joined together (i.e. welded, bonded and/or sewn together, for example). In the assembly of the selected elements, the belt is inserted into the belt-guiding grooves. The play of the belt in the belt-guiding grooves compensates for any differences in length.

In a preferred embodiment of the invention, the deflection apparatus, in particular according to the described modular construction system, comprises no tensioning apparatus. Preferably, the return circuit of the roller body here runs substantially equidistant to the region in which the roller body runs along the conveying means. A particularly space-saving and elegant design is thus possible.

In further preferred embodiments of the invention, the central body is adjustable in its shape and a deflection angle of the deflection apparatus is thereby adjustable. For instance, the following realizations of this adjustability are possible:

The central body comprises at least two sectors, each sector consisting of a number of flat blades, which are arranged parallel to one another and jointly form on one side, with their end faces, a curved rolling region. Two sectors can be slid, with alternating blades, one into the other, in a similar fashion as in a variable capacitor. Depending on how far they are slid one into the other, the deflection angle is larger or smaller.

The central body comprises, in the rolling region, a succession of straight or slightly curved segments, which are mutually adjustable, and form, as a totality, a deflection angle by a succession of individual portions.

The whole of the central body, or only a thin part of the central body, which forms the roller track, is formed from a flexible material. This is clamped in place in a certain angular configuration and can be released and reclamped at another angle.

The length of the roller body can in each case be adjusted, for instance, by a tensioning element.

A method for manufacturing a roller body for use in one of said deflection apparatuses preferably comprises the following steps:

forming of a roller belt by cutting-out of recesses with bearing projections made from a strip-shaped flat material;

insertion of rollers into the recesses, the bearing projections coming to lie in indentations of the rollers;

forming of a closed circle by overlapping of the two ends of the roller belt (an overlap being present around the region of one roller or a plurality of rollers);

preferably, bonding or welding together, or stapling or sewing together, of the optionally overlapping ends of the roller belt.

Alternatively—depending on the material of the roller belt—the ends can also be butt-welded.

All said combinations of rollers and roller belts or belts and their shapings are fundamentally also installable in systems, without a deflection apparatus being present, as a separate structural unit. This is the case, for instance, in helical conveyors, in which the roller body rises along the length of a conveyor belt along a spiral and is then returned, or in other complicated and long paths.

Further preferred embodiments emerge from the dependent patent claims. By analogy, features of the method claims can here be combined with the apparatus claims, and vice versa.

BRIEF DESCRIPTION OF THE DRAWINGS

The subject of the invention is explained in greater detail below with reference to preferred illustrative embodiments represented in the appended drawings, in which, respectively in schematic representation.

The reference symbols used in the drawings, and the meaning thereof, are listed in summarized form in the reference symbol list. In the figures, identical parts are fundamentally provided with the same reference symbols.

DETAILED DESCRIPTION OF THE INVENTION

Figure 1:
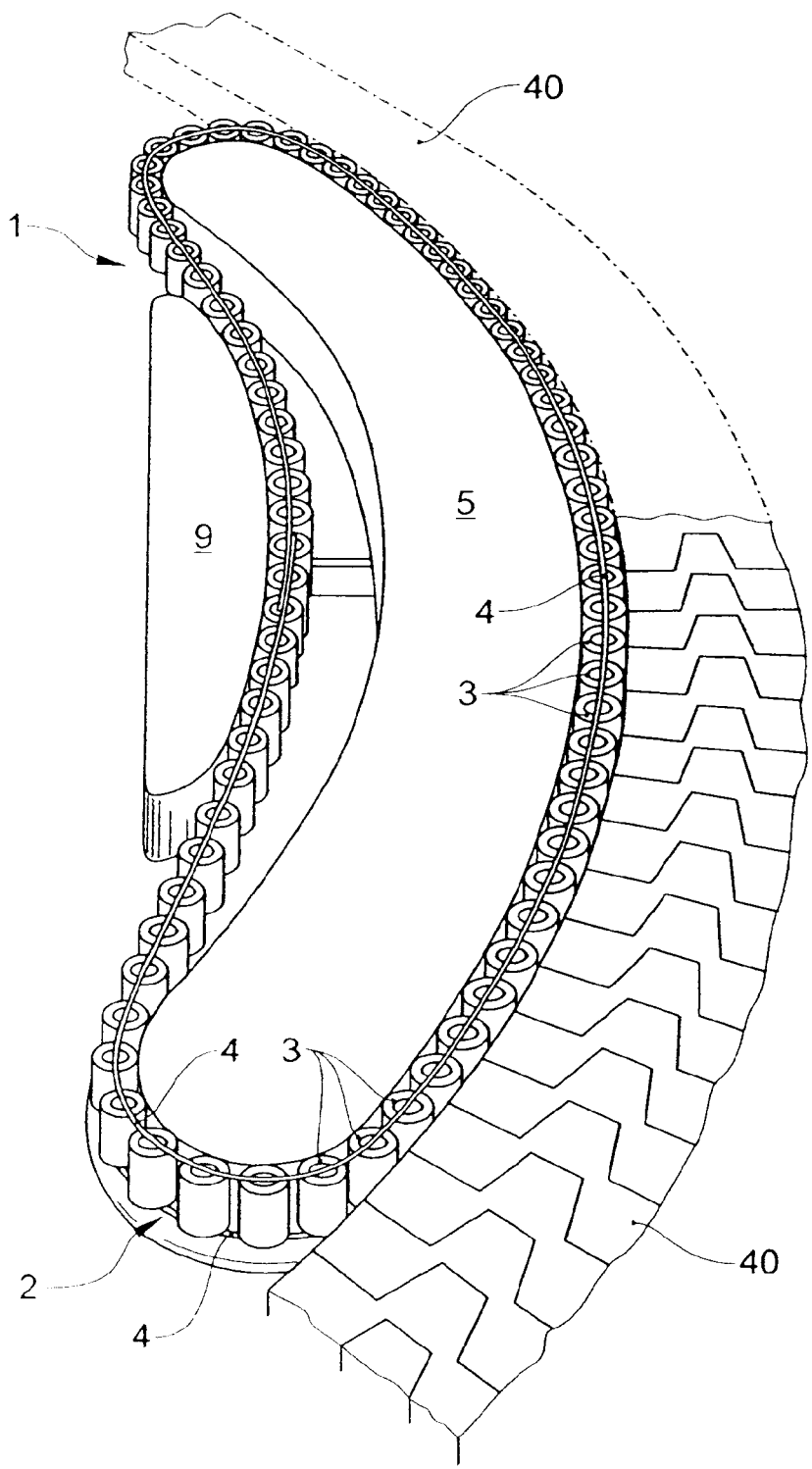
FIGS. 1 and 2 show views of a deflection apparatus for a conveyor belt.
Figure 2:
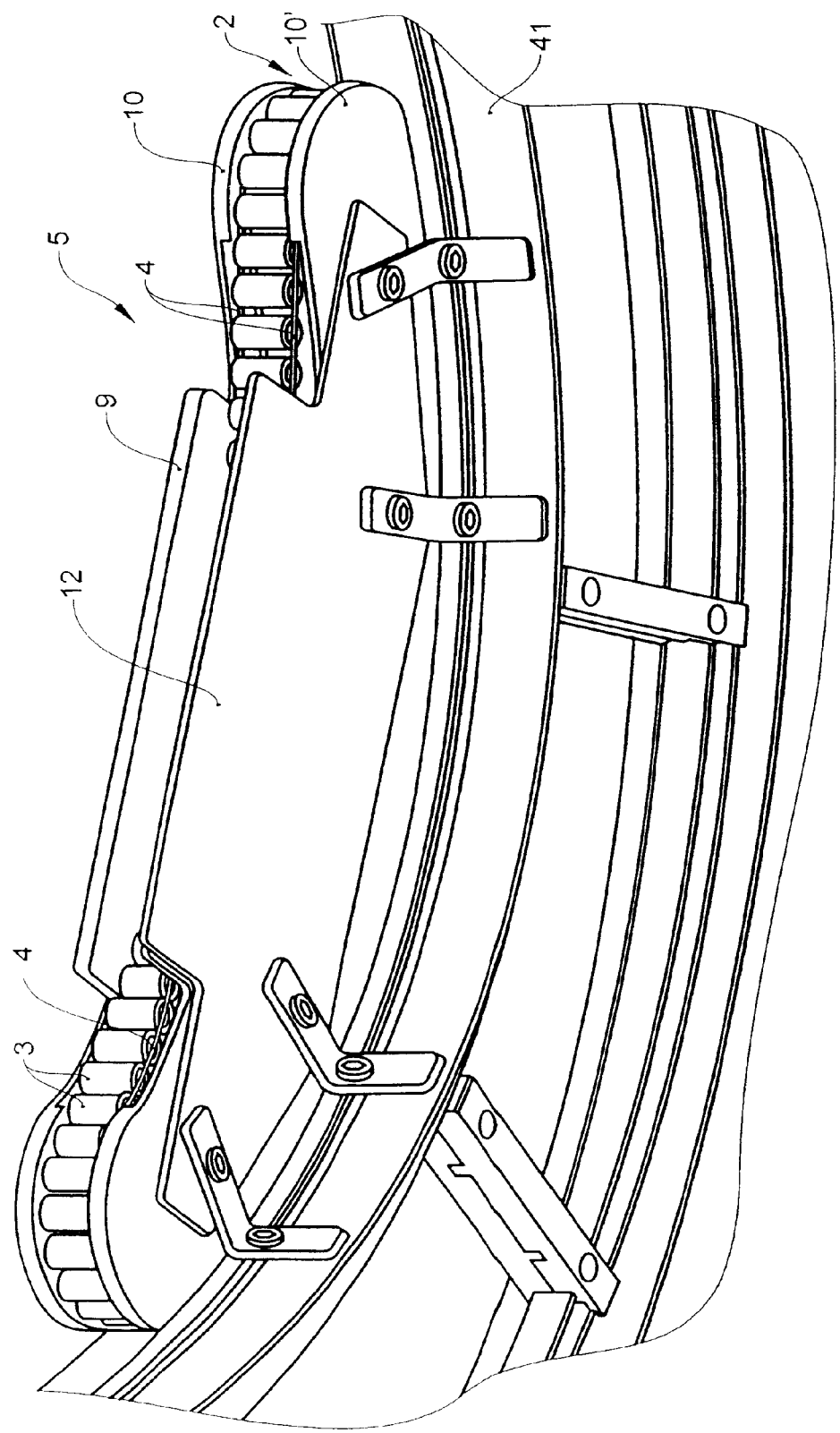

FIGS. 1 and 2 show views of a deflection apparatus 1 for a conveyor belt 40. The deflection apparatus 1 comprises a central body 5, around which a roller body 2 is disposed in circulating arrangement. The roller body 2 runs in a rolling region between the central body 5 and the conveyor belt 40 and, upon movement of the conveyor belt 40, rolls on a roller track 13 of the central body 5. The roller body 2, with its rollers 3, hereupon transmits compressive forces perpendicularly to the roller track 13. The forces which are necessary to change the direction of the conveyor belt 40 are hence absorbed with minimal friction. The individual rollers 3 are mounted in a circulating roller belt 4. In FIG. 1, the roller belt 4 is represented only schematically by its top and bottom side, the precise structure of the roller belt 4 being apparent from FIGS. 3 and 4. The roller belt 4 is guided in a guide of the central body 5, which is likewise not represented in FIG. 1. This guidance is realized by a belt-guiding groove 11 in each of an upper and a lower belt-guiding body 10, 10' represented in FIG. 2. These belt-guiding bodies 10, 10' are a component part of the central body 5 and are mounted, for instance, as separate parts ("top cover" and "base") on a middle body of the central body 5. FIG. 2 further shows a mounting 12, which, on the one hand, connects the tensioning body 9 adjustably to the central body 5 and, on the other hand, allows the deflection apparatus 1 to be fitted as an entire, independent structural unit, to a guide 41 of the conveyor belt 40.

Figure 3:
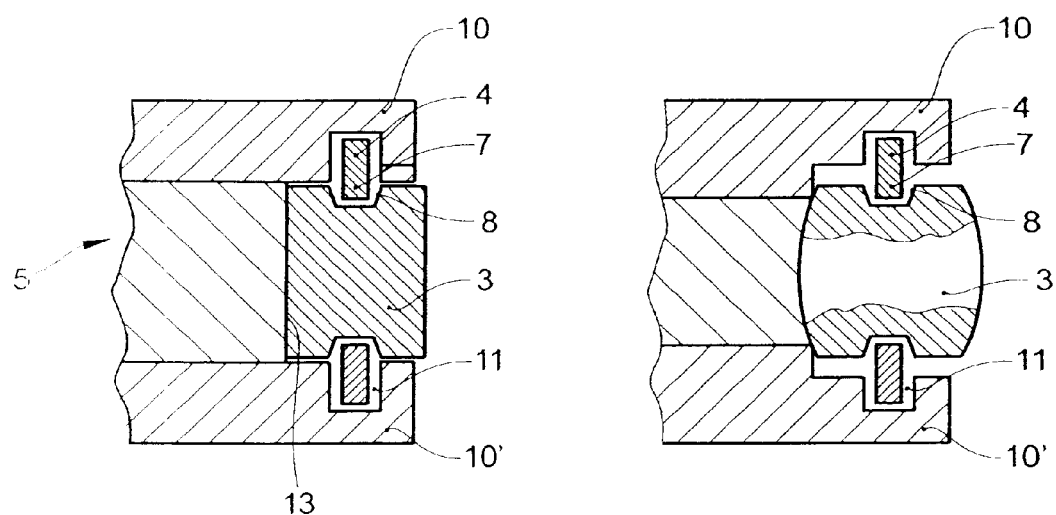
FIG. 3 shows a cross section through a rolling region with a guidance of a roller belt.

FIG. 3 shows cross sections through a rolling region with the guidance of a roller belt 4 in the belt-guiding groove 11. It can also be seen how the rollers 3, on the one hand, roll on the roller track 13 on the central body 5 and, on the other hand, protrude on the outer side over the central body 5 and the belt-guiding bodies 10, 10'. This ensures that the conveyor belt 40 comes into contact only with the roller 3 and does not rub against the central body 5. Alternatively, with the same effect, the rollers 3 can also be shaped longer than the height of the conveyor belt 40. In the embodiment according to the left-hand representation, the rollers 3 are cylindrical and slip (if the deflection apparatus 1 is oriented as drawn), due to their own weight, with their lower end on the lower belt-guiding body 10'. If the deflection apparatus 1 is used for vertical support, the shafts of the rollers 3 run horizontally and this slippage does not occur. In the embodiment according to the right-hand representation, the rollers 3 are cambered or barrel-shaped and are pulled against the roller track 13 by the tension of the roller body 2. As a result, the rollers 3 are centered with respect to the roller track 13 and do not slip on the belt-guiding body 10.

Figure 4:
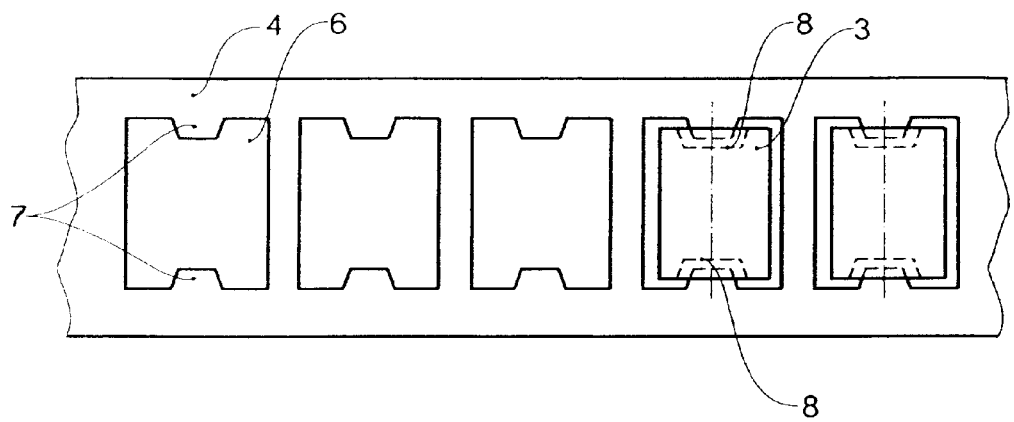
FIG. 4 shows a top view of a portion of a roller belt, with, in part, inserted rollers.

FIG. 4 shows a top view of a portion of a roller belt 4, with, in part, inserted rollers 3. The roller belt 4 comprises successive recesses 6, each recess 6 respectively comprising on both sides of the belt an inward-pointing bearing projection 7. The rollers 3 are provided at their axial ends with indentations 8, so that the bearing projections 7 of the flexible roller belt 4 can snap into or be introduced into the indentations 8. The roller belt 4, on the one hand, has such flexibility that it can be bent to run round the central body 5 and, on the other hand, is stable or stiff enough that the rollers 3, following insertion into the recesses 6, are held by the bearing projections 7. The bearing projections 7 generally support only the weight of the rollers 3.

Figure 5:
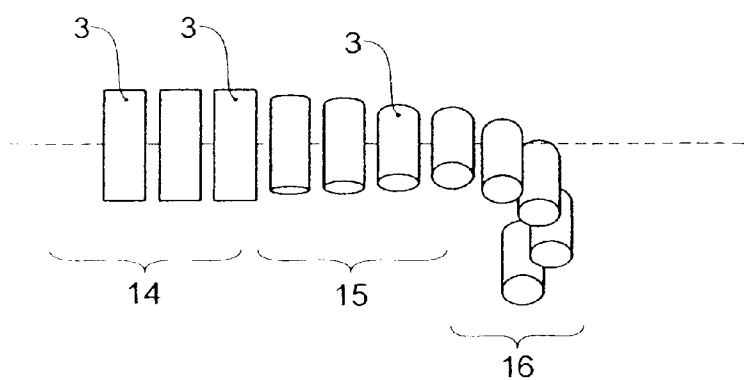
FIG. 5 shows a deflection apparatus having a twisted path.

FIG. 5 shows, by way of example and schematically, a twisted path of rollers 3 in a deflection apparatus, only the rollers 3 being illustrated. In a first region 14, the roller body 2 is bent only about an axis parallel to the roller shafts. In a twisted region 15, the roller body 2 is twisted or distorted about its longitudinal axis and, accordingly, also the roller track. In a second region 16, the roller body 2 is again curved about an axis parallel to the roller shafts. As a result of the intervening torsion, it follows that the roller shafts in the first and in the second region do not run parallel to each other. With a roller belt 4 comprising only a middle connection between the rollers (in place of the connection according to FIG. 4, which is formed by the entire width of the roller belt 4), an even freer, three-dimensionally varying guidance of the roller track is possible.

Figure 6:
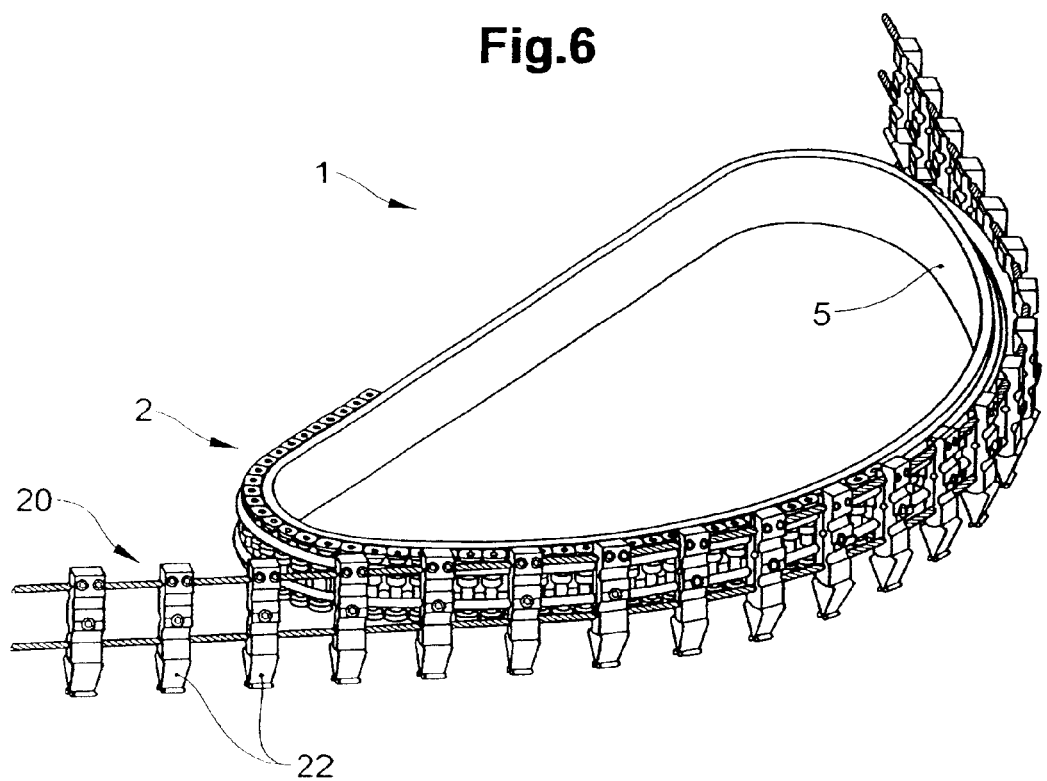
FIGS. 6 to 8 show a deflection apparatus having a roller body with circulating belts.
Figure 7:
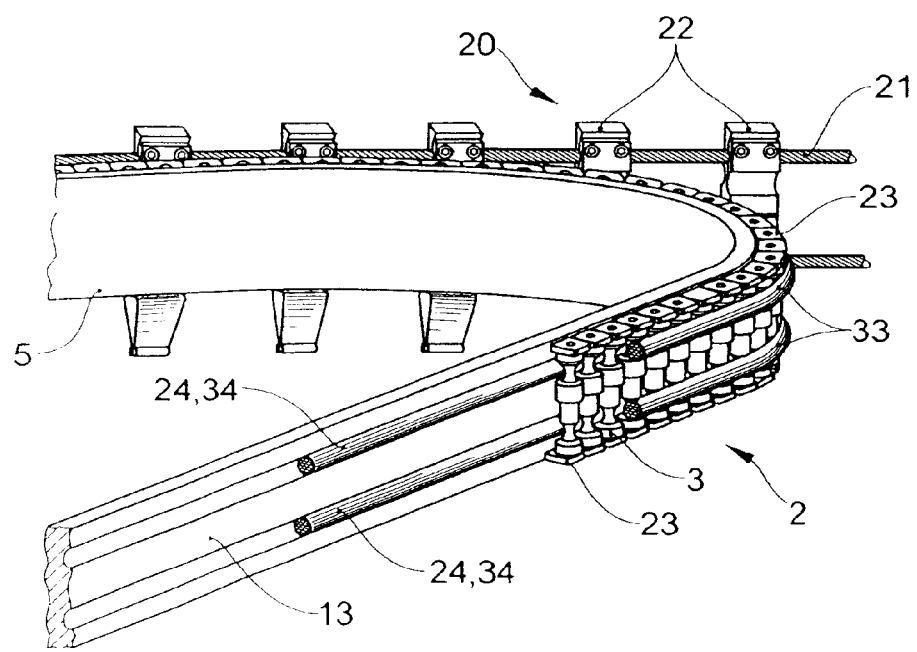
Figure 8:
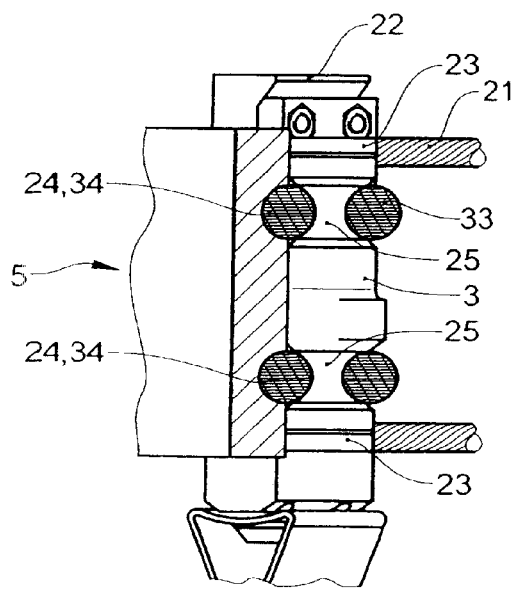

FIGS. 6 to 8 show a deflection apparatus 1 comprising a roller body 2 with belts or cables 33 circulating around the roller body 2. The belts 33 thereby hold the rollers 3 against the central body 5. As an illustrative corresponding conveying apparatus, a cable conveyor 20 is shown. In this, supports 22 are fastened to two parallel cables 21 and are guided and transported thereby. The supports 22 comprise rolling grooves 29, the shape and distance of which corresponds with that of the belts 33. The supports 22 are hence supported when rolling on the rollers 3 or when traveling along the belts 33 in a direction parallel to the roller shafts.

The rollers 3 are here distanced from one another, in place of a roller belt, by distancing bodies 23. The distancing bodies 23 are attached to both ends of the rollers 3 and protrude over the rollers 3 in the running direction, though preferably not in the direction perpendicular to the running direction. The distancing bodies 23 prevent the equidirectionally rotating rollers 3 from touching and rubbing against one another. Alternatively, the distancing bodies 23 can also be present in the region of the middle of the rollers 3. The distancing bodies 23 of a roller 3 are mounted rotatably in relation to the roller. Since this bearing support absorbs only the forces for the distancing of the rollers, no significant friction is generated and plain bearings are sufficient.

For the reception of the belts 33, the rollers 3 comprise concave roller portions 25 into which the belts 33 fit. The roller track 13, too, comprises guide projections 24 or inserted, immovable cables or further belts 34, the shape of which corresponds with that of the concave roller portions 25. Axial forces acting upon the rollers 3 are hence transmitted to the central body 5 and the rollers 3 are supported with respect to the central body 5.

Figure 10:
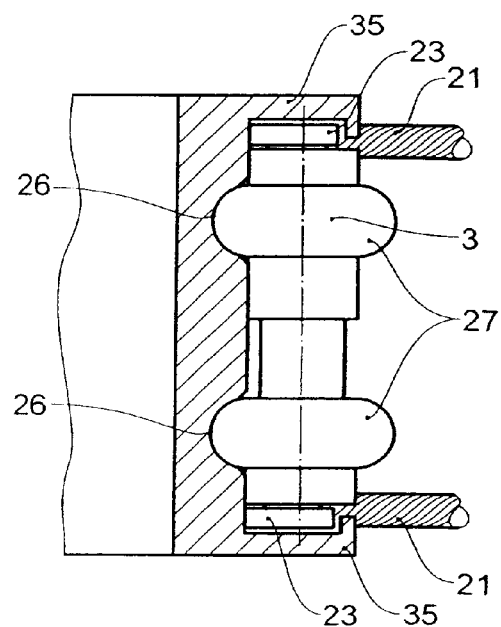
FIGS. 9 and 10 show a deflection apparatus having rollers guided in a groove.
Figure 9:
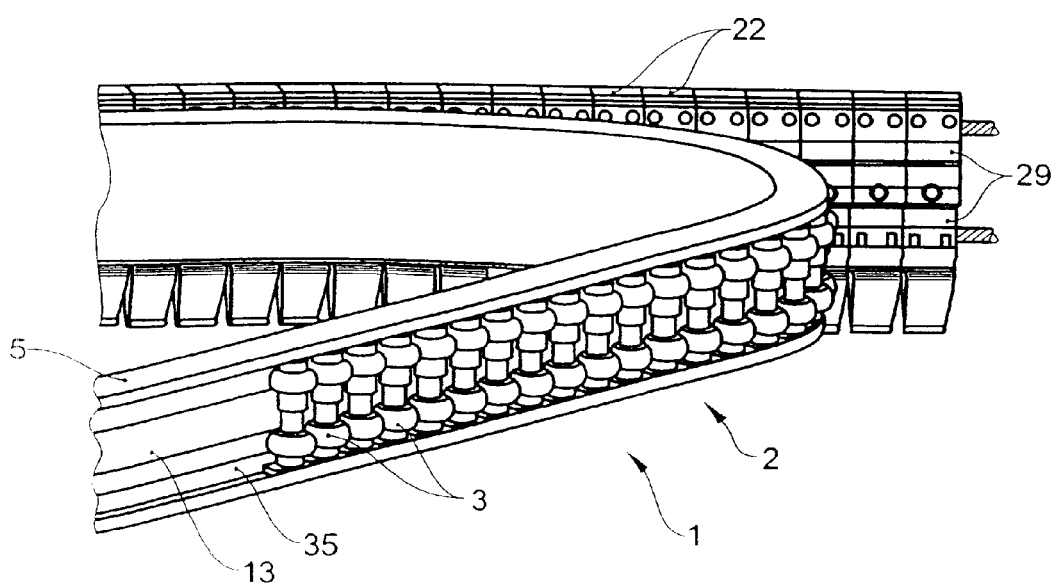

FIGS. 9 and 10 show a deflection apparatus 1 comprising rollers which are guided in a groove and in this way circulate around the central body 5. Since no belts for holding together the roller body 2 are present here, the rollers 3 are guided with their shafts (or indirectly via the distancing bodies 23) in retaining grooves 35, which prevent the rollers 3 from falling out. Analogously to the previous embodiment, the rollers 3 comprise convex roller portions 27, and the roller track 13 comprises corresponding guide grooves 26 and the supports 22 corresponding rolling grooves 29.

Figure 11:
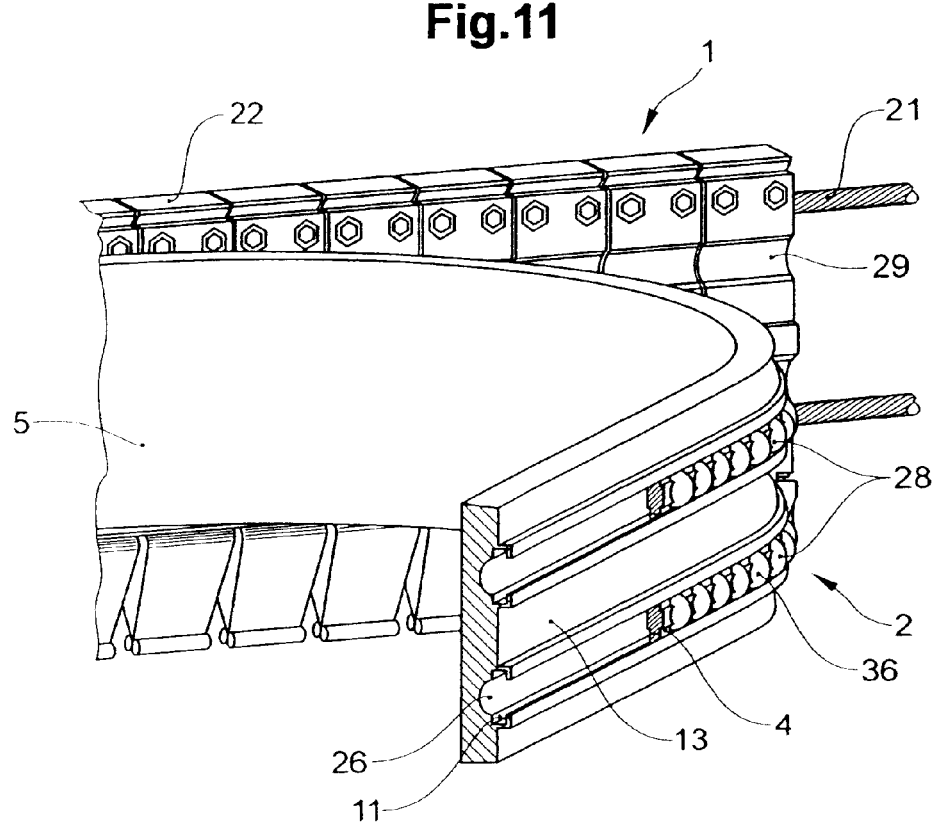
FIG. 11 shows a deflection apparatus having a ball belt as a roller body.

FIG. 11 shows a deflection apparatus 1 comprising a ball chain 28, circulating around the central body 5, as the roller body 2. The ball chain 28 is preferably produced like the aforementioned roller belt 4, but, for the bearing support of the balls 36, an intermediate body made from hard plastic is preferably inserted in the belt. Preferably, two ball chains 28 guided at a constant distance apart in a respective guide groove 26 are present. In addition, each ball chain 28 is secured against falling out by belt-guiding grooves 11, which embrace the belt from both sides.

Figure 12:
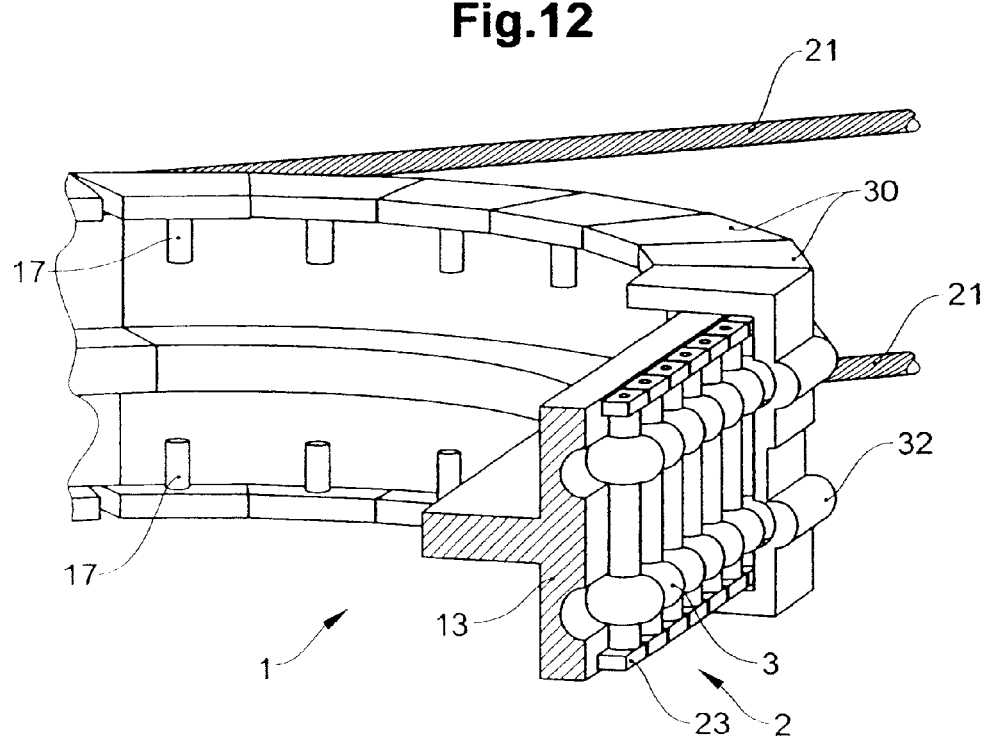
FIG. 12 shows a deflection apparatus having a protective means for covering the rollers.

FIG. 12 shows a deflection apparatus 1 comprising a protective means 30 for covering the rollers 3. Such a protective means is usable in all previously shown embodiments of the invention, but is illustrated here only with reference to one example. The protective means is formed by a succession of U-shaped bar elements 30. These enclose the rollers 3 and a part of the central body 5 and, thus, protect the rolling parts from dirt contamination. Retaining elements, rollers or retaining pins 17 of the bar elements 30 enclasp the roller track 13 and secure the bar elements 30 against the rollers 3. The bar elements 30, thus, slide or roll partially on the rear side of the roller track 13, roll on the rollers 3, and the supports 22 or other elements of the conveying system move in the rolling region jointly with the circulating bar elements 30. For the support of the (non-illustrated) supports, the bar elements 30 comprise bulges 32, and on the inner side further shapings, which, as in the previous embodiments, correspond for support purposes with the shape of the rollers 3.

Figure 13:
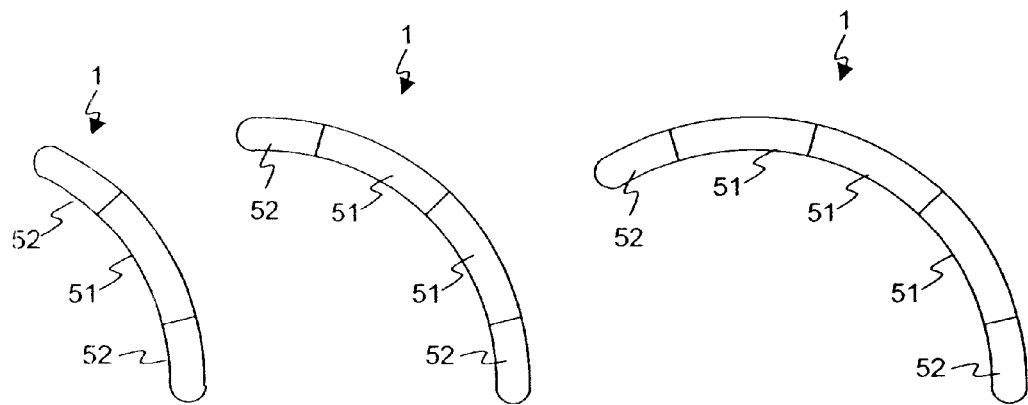
FIG. 13 shows deflection apparatuses made up of elements which can be modularly assembled.

FIG. 13 shows in schematic representation, deflection apparatuses 1 having different deflection angles, which deflection apparatuses can be composed of elements which can be modularly assembled, i.e. in this case, sector elements 51 and end elements 52. A set of modular elements comprises, for instance, no, one, or a plurality of sector elements 51, two end elements 52, a roller belt 4, which is cut to size in accordance with the deflection angle, and, optionally, fixed components 60 extending over all the elements, and further includes connecting and fastening elements. The sector elements 51 and end elements 52 can themselves also again consist of a plurality of components 53, 54, 55.

Figure 14:
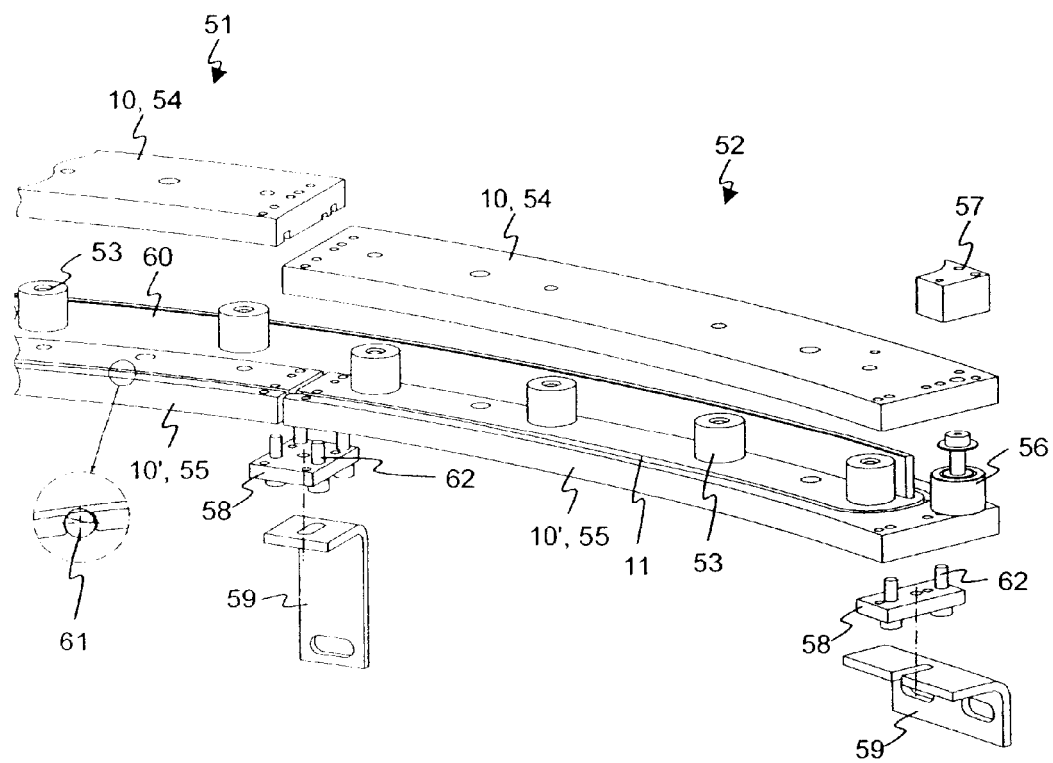
FIG. 14 shows a structure of a subportion of a deflection apparatus made up of modular elements.

FIG. 14 shows a more detailed structure of a subportion of a deflection apparatus 1 which can be assembled from modular elements, in a preferred embodiment of the invention. A sector element 51, as well as an end element 52, each comprise a top body 54 and a bottom body 55. These, in turn, respectively comprise a belt-guiding groove 11 and are distanced from one another by one or more middle bodies. In the shown embodiment, the middle body is formed by a plurality of distancing elements 53, but can also be formed by a single block, or can be formed onto a top body 54 or a bottom body 55. In the end elements 52, the belt-guiding groove 11 in each case forms a curve, which curves divert the roller belt 4 from a rolling region (in which the conveyed bodies roll on the roller belt 4) into a return circuit region. In the region of this curve, there is preferably also arranged a curve end roller 56 or a curve end slide block 57, which lead the conveyed objects up to the roller belt 4 or away from the roller belt 4. In the return circuit region, the belt-guiding groove 11, and thus the roller belt 4, preferably runs equidistant to the belt-guiding groove 11 in the rolling region.

The roller track 13 is here formed by a roller track 60 made from a planar and flexible material, which is inserted and held in retaining grooves of the top body 54 and bottom body 55. The roller track 60 extends over and connects the individual sector elements 51 and end elements 52, and thus, forms a roller track 13 which runs through over all sectors. In this way, no offsets between the sectors are formed.

The individual elements are connected to one another by connecting plates 58 comprising pins or screws 62 or other connecting means. In addition, angle brackets 59 can also be attached to the connecting plates 58 for fastening the deflection apparatus 1 to a conveying apparatus.

A track opening or diverter 61 is represented schematically in a detailed view of FIG. 14. Such a diverter 61 forms a closable opening in the side walls of the upper and lower belt-guiding groove 11, so that the roller belt 4 can be installed and removed even without disassembly of the deflection device 1. In this case, the roller belt 4, for instance in the installation, is initially not yet closed into a loop and is first threaded by the diverter 61 into the roller track 13. The roller belt 4, lying in the roller track 13, is then connected to form a loop.

The individual elements (such as roller bodies, rollers, cables, distancing bodies, roller track, etc.) and their various variants can in further preferred embodiments of the invention also be differently combined with one another. In addition, the deflection apparatuses 1 can also be used as tensioning means for tensioning moved conveying means, such as, for example, conveyor belts, or to transmit force to the drive mechanism of such conveying means. Preferably, however, the deflection apparatus 1 is not driven, but is passively jointly moved by the conveying apparatus 40.

REFERENCE SYMBOL LIST 1 deflection apparatus
2 roller body
3 roller
4 roller belt
5 central body
6 recess
7 bearing projection
8 indentation
9 tensioning body
10,10' belt-guiding body
11 belt-guiding groove
12 mounting
13 roller track
14 first region
15 twisted region
16 second region
17 retaining pin
20 cable conveyor
21 cable
22 support
23 distancing body
24 guide projection
25 concave roller portion
26 guide groove
27 convex roller portion
28 ball chain
29 rolling groove on support
30 bar element
31 indentation
32 bulge
33 belt
34 further belt
35 retaining groove
36 ball
40 conveyor belt
41 guide of the conveyor belt
51 sector element
52 end element
53 distancing element
54 top body
55 bottom body
56 curve end roller
57 curve end slide block
58 connecting plate
59 angle bracket
60 rolling plate
61 diverter
62 connecting pins

The invention claimed is:

1. A deflection apparatus for a conveying system, wherein the deflection apparatus comprises:
    a central body,
    a roller body circulating around the central body,
    wherein the roller body comprises a multiplicity of rollers, which are guided with play and roll in a roller track of the central body,
    wherein the deflection apparatus forms an independent structural unit, which can be assembled, disassembled and transported as a unit and can thus be installed as an independent structural unit in order to deflect a conveying means in a conveying system,
    wherein the rollers are guided in a roller belt and are distanced from one another, and
    wherein the roller belt is produced from a fabric or plastic-impregnated fabric.

2. The deflection apparatus for a conveying system as claimed in claim 1, wherein the deflection apparatus is realized in lightweight construction, with rollers made from plastic and the central body from plastic or aluminum.

3. The deflection apparatus for a conveying system as claimed in claim 1, wherein the central body is adjustable in its shape and a deflection angle of the deflection apparatus is thereby adjustable.

4. The deflection apparatus for a conveying system as claimed in claim 1, wherein the roller belt can be tensioned against the central body by means of a one-piece tensioning body, the tensioning body being fixed and the roller belt rolling with the rollers on the tensioning body.

5. The deflection apparatus for a conveying system as claimed in claim 4, wherein the tensioning body is mounted on the central body with a mounting, and the central body forms with the roller belt and the tensioning body an independent structural unit, which can be assembled, disassembled and transported as a unit.

6. The deflection apparatus for a conveying system as claimed in claim 1, wherein the roller belt is produced from a flexible flat material.

7. The deflection apparatus for a conveying system as claimed in claim 1, wherein the central body comprises a plurality of modular elements, which each form a sector corresponding to a partial deflection angle, and a plurality of such modular elements can be used to assemble central bodies for deflection apparatuses having different deflection angles.

8. The deflection apparatus for a conveying system as claimed in claim 7, wherein the central body further comprises at least one immobile element, acting as a roller track, which element extends over a plurality of the modular elements and, -over the whole of the deflection angle of the deflection apparatus.

9. The deflection apparatus for a conveying system as claimed in claim 1, wherein the roller belt comprises balls as rollers, and two of such roller belts are arranged such that they circulate around the central body.

10. The deflection apparatus for a conveying system as claimed in claim 1, wherein the roller belt runs with its two outer edges in a belt-guiding groove of the central body and is thereby guided and prevented from falling out.

11. The deflection apparatus for a conveying system as claimed in claim 1, wherein the roller body consists of a multiplicity of individual rollers, which are not chained together and which are arranged such that they roll round the central body and are distanced from one another by distancing bodies, the distancing bodies being mounted rotatably on the shafts of the rollers and preventing the rotating rollers from touching one another.

12. The deflection apparatus for a conveying system as claimed in claim 1, wherein the rollers have shapings for the transmission of axial forces to the central body, and the roller track comprises correspondingly shaped shapings.

13. The deflection apparatus for a conveying system as claimed in claim 11, wherein the rollers run with their distancing bodies or their axial ends in a retaining groove of the roller track, the retaining groove preventing the rollers from falling out of the roller track of the central body.

14. The deflection apparatus for a conveying system as claimed in claim 1, wherein the rollers are held against the central body by at least one circulating belt.

15. The deflection apparatus for a conveying system as claimed in claim 14, wherein the rollers comprise concave roller portions in which the at least one circulating belt runs, and the central body comprises corresponding guide projections, and the rollers are held in the axial direction by the engagement of the guide projections in the concave roller portions.

16. A deflection apparatus for a conveying system, wherein the deflection apparatus comprises:
a central body,
a roller body circulating around the central body,
wherein the roller body comprises a multiplicity of rollers, which are guided with play and roll in a roller track of the central body,
wherein the deflection apparatus forms an independent structural unit, which can be assembled, disassembled and transported as a unit and can thus be installed as an independent structural unit in order to deflect a conveying means in a conveying system,
wherein the rollers are guided in a roller belt and are distanced from one Another, and
wherein the rollers belt comprises recesses having bearing projections, and the rollers, with indentations, are inserted in the bearing projections and are thus loosely supported by the bearing projections.

17. A deflection apparatus for a conveying system, wherein the deflection apparatus comprises:
a central body,
a roller body circulating around the central body,
wherein the roller body comprises a multiplicity of rollers, which are guided with play and roll in a roller track of the central body,
wherein the deflection apparatus forms an independent structural unit, which can be assembled, disassembled and transported as a unit and can thus be installed as an independent structural unit in order to deflect a conveying means in a conveying system, and
wherein arranged between the rollers and the conveyor means is a protective means, which rolls on the rollers and encloses the roller body on several sides.

18. The deflection apparatus for a conveying system as claimed in claim 17, wherein the protective means is formed by a succession of bar elements, which, following closely one upon the other and touching one another, roll on the rollers.

19. A deflection apparatus for a conveying system, wherein the deflection apparatus comprises:
a central body,
a roller body circulating around the central body,
wherein the roller body comprises a multiplicity of rollers, which are guided with play and roll in a roller track of the central body,
wherein the deflection apparatus forms an independent structural unit, which can be assembled, disassembled and transported as a unit and can thus be installed as an independent structural unit in order to deflect a conveying means in a conveying system,
wherein the rollers have shapings for the transmission of axial forces to the central body, and the roller track comprises correspondingly shaped shapings, and
wherein the roller are slightly cambered, i.e. barrel-shaped, and the roller track is correspondingly concave in shape.

20. A method for manufacturing a roller body for use in a deflection apparatus wherein the roller body circulates around a roller track of a central body of the deflection apparatus, having the following steps:
forming a roller belt by cutting-out of recesses with bearing projections made from a strip-shaped flat material;
inserting rollers, spaced from one another, into the recesses, the bearing projections coming to lie in indentations of the roller; and
forming of a closed circle by overlapping or butt-joining and subsequent connecting of the two ends of the roller belt(4).

21. The method as claimed in claim 20, wherein
ends of the roller belt which overlap upon formation of a closed circle overlap around the region of a roller or a plurality of rollers.

22. The method as claimed in claim 20, comprising the step:
bonding or welding together, or stapling or sewing together, of the overlapping or butt-joined ends of the roller belt.7

* * * * *